United States Patent
Horesh et al.

(10) Patent No.: US 10,503,929 B2
(45) Date of Patent: Dec. 10, 2019

(54) VISUALLY CONFIGURABLE PRIVACY ENFORCEMENT

(71) Applicant: International Business Machines Corporation, Armonk, NY (US)

(72) Inventors: Lior Horesh, North Salem, NY (US); Raya Horesh, North Salem, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/243,278

(22) Filed: Aug. 22, 2016

(65) Prior Publication Data

US 2018/0053016 A1 Feb. 22, 2018

(51) Int. Cl.
*G06F 21/00* (2013.01)
*G06F 21/62* (2013.01)
*G06F 21/53* (2013.01)

(52) U.S. Cl.
CPC .......... *G06F 21/6263* (2013.01); *G06F 21/53* (2013.01)

(58) Field of Classification Search
CPC .............................. G06F 21/604; G06F 21/64
See application file for complete search history.

(56) References Cited

U.S. PATENT DOCUMENTS

| 2013/0172211 A1 | 7/2013 | Oliphant et al. |
| 2014/0059695 A1 | 2/2014 | Parecki et al. |
| 2014/0317715 A1 | 10/2014 | Conner et al. |

FOREIGN PATENT DOCUMENTS

WO WO2015127383 A1 8/2015

OTHER PUBLICATIONS

Omer Tripp, "Application- and User-sensitive Privacy Enforcement in Mobile Systems", 2015, IEEE, 2nd ACM International Conference on Mobile Software Engineering and Systems, pp. 162-163.*
Pistoia, M. et al., "Labyrinth: Visually Configurable Data-leakage Detection in Mobile Applications", 2015, pp. 279-286,16th IEEE International Conference on Mobile Data Management.

(Continued)

*Primary Examiner* — Jeffrey C Pwu
*Assistant Examiner* — Thong P Truong
(74) *Attorney, Agent, or Firm* — Scully, Scott, Murphy & Presser, PC; Daniel P. Morris, Esq.

(57) ABSTRACT

A method is disclosed including presenting via a graphical user interface of an application at least one element that is activatable to specify a source of information as a source of information to be logged, receiving from the user via the graphical user interface an activation of the at least one element, and in response to receiving the activation of the at least one element, instrumenting the application to capture and log information received from the specified source of information, capturing information received by the application from the specified source using the instrumentation, logging the information in memory, capturing data that is output by the application, comparing the captured data to the logged information, determining based on the comparison that a leak of the information has occurred, and in response to determining that a leak of the information has occurred, performing a corrective action.

20 Claims, 8 Drawing Sheets

(56) References Cited

OTHER PUBLICATIONS

Tripp, O et al., "Application- and User-sensitive Privacy Enforcement in Mobile Systems", 2015, pp. 162-163, 2015 2nd ACM International Conference on Mobile Software Engineering and Systems.

Anonymously, "Technique to mark applications private to protect sensitive content" Nov. 22, 2013, pp. 1-2, http://ip.com/IPCOM/000232629D.

Anonymously, "A Policy-controlled Adaptive Platform for Querying Real-time SmartPhone Data" Jun. 26, 2013, pp. 1-9, http://ip.com/IPCOM000228639D.

\* cited by examiner

VISUALLY CONFIGURABLE PRIVACY ENFORCEMENT

FIELD

The present application relates generally to privacy enforcement for user devices.

BACKGROUND

Applications installed on user devices such as, e.g., mobile devices, smart phones, and the like, have access to many different categories of private information that reside on the user devices. Such private information includes, but is not limited to, the unique device ID, current geographical location, calendar events, contacts and other data. Furthermore, the applications may receive as an input security-sensitive information, including user IDs and passwords, as well as credit-card, social-security and bank-account numbers. Guaranteeing that this private data is not exposed to unintended observers is an essential security requirement. Application providers are encouraged to test their applications thoroughly and to use static and dynamic program analysis tools in order to discover leakage of private data.

Unfortunately, using such tools effectively may be challenging when dealing with issues related to confidentiality. For example, in many applications, only a small portion of the private data on the user device is accessed using well-known standard libraries. Using an out-of-the-box configuration of a program analysis tool may indeed help in detecting leakage of such data, however, commercial and enterprise applications often utilize large amounts of application-specific private data, such as user ID and passwords, health records, credit-card numbers, bank-account numbers and social-security numbers.

The default configuration of a program-analysis tool is likely to miss the unauthorized release of custom sensitive data. On the other hand, configuring these tools to detect application specific data leakage is a non-trivial task, which may require accessing the source code of the application to infer the specific program points through which private data enters the application. In order to perform this advanced configuration, an entity verifying the security of the application not only has to be versed in application security, but also be intimately familiar with the application's source code and functionality.

BRIEF SUMMARY

The methods, systems, and computer program products disclosed herein provide visually configurable data leakage detection.

In an aspect of the present disclosure, a method is disclosed including presenting via a graphical user interface of an application installed on a user device at least one element associated with a source of information. The at least one element is activatable by the user to specify the source of information as a source of information to be logged. The method further includes receiving from the user via the graphical user interface an activation of the at least one element. The activation specifies that the source of information is to be logged. The method further includes, in response to receiving the activation of the at least one element, instrumenting the application. The instrumentation is configured to capture and log information received from the specified source of information. The method further includes capturing information received by the application from the specified source using the instrumentation, logging the information in memory, capturing data that is output by the application, comparing the captured data to the logged information, determining based on the comparison that a leak of the information has occurred, and in response to determining that a leak of the information has occurred, performing a corrective action.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
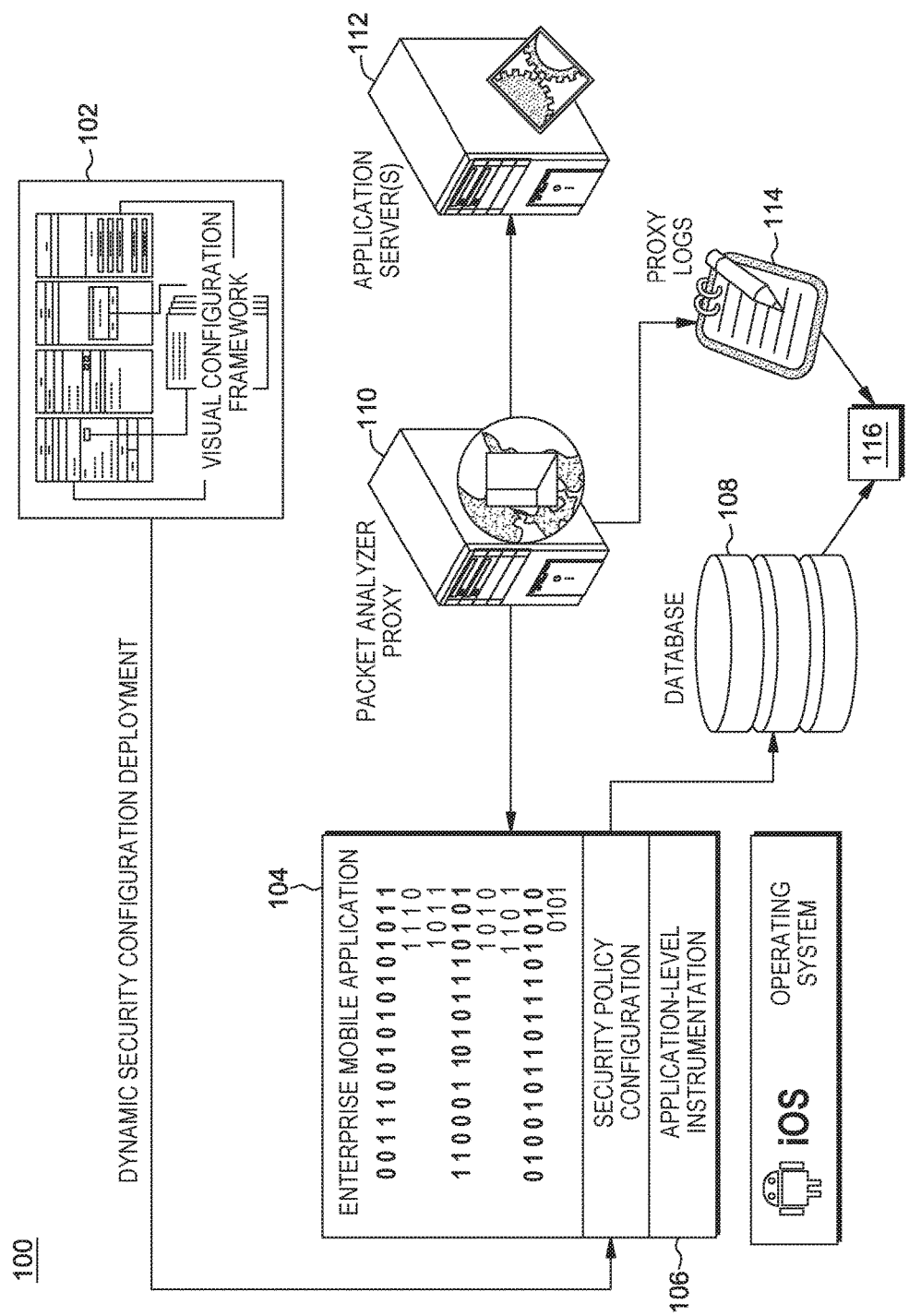
FIG. 1 is a system diagram of a system for visually configurable privacy enforcement in accordance with an aspect of the present disclosure.

Privacy-enforcement methods and systems for user devices are disclosed. The privacy-enforcement system advances the state of the art in usable security by allowing a user to visually configure application-specific sources of confidentiality through which private data enters the application directly on the application running on the user device. Due to this visual approach, the security configuration of the runtime enforcement policy can be completed without requiring access to the application's source code. Instead, the visual configuration is automatically integrated with the default security configuration of the user device, which accounts for private data entering the application through well-known libraries such as, for example, Android's LocationManager library or other commonly used libraries.

The privacy-enforcement system respects a Bring Your Own Device (BYOD) paradigm by not requiring instrumentation of the entire operating system of the user device. Instead, once an application's security configuration is completed, for example, by identifying input fields as sources of confidential or private data, the privacy-enforcement system may instrument the target application directly. At run time, the value of each field that was labeled as a source of private data may be logged, e.g., the input string or other data may be stored in memory or a database for later use. Furthermore, the privacy-enforcement system may automatically instrument the application based on the configuration in order to log other security-sensitive data that is not associated with a visual field in a user interface of the application. Such data may include, for example, the device's unique ID, Subscriber Identity Module (SIM) card ID, current geographical location, user contacts, calendar events, photographs, audio files, telephone number, and other similar data.

The enforcement aspect of the privacy-enforcement system may include a man-in-the-middle proxy that captures and logs all the data that the application exchanges with its back-end servers. The data captured by the proxy may then be scanned in order to detect if any logged data from the fields that have been configured as private on the application is transmitted in the clear, e.g., unaltered, unsecured, unencrypted, un-encoded, etc., thereby becoming observable to unauthorized entities. Often, an application may reformat the data it receives as input, including private data, and transmit over the network a modified version of the original value entered by the user or retrieved from the device. For example, a social-security number entered by the user as 123-456-7890 may be reformatted and transmitted over the network without dashes as 1234567890. Rather than looking for exact matches, the privacy-enforcement system incorporates a detection algorithm that discovers a similarity between values with configurable distance and also takes into account operations such as encoding and hashing.

Furthermore, the privacy-enforcement system may account for other operations that obfuscate private data without ensuring proper confidentiality. For example, developers may often write application login routines in such a way that a user's password's hash, rather than the password itself, is transmitted over the network to an authentication server. The authentication server may compare the password hash received from the client with a password hash computed locally on the server. This may prevent the password from having to be transmitted in the clear. Nevertheless, this approach may not be secure unless the entire communication between the client and the authentication server is encrypted using an encryption protocol, for example, the Secure Sockets Layer (SSL) protocol. In fact, without proper encryption, an attacker may be able to steal the user's password hash and transmit the password hash over the network to the authentication server along with the corresponding user ID, thereby impersonating the user. The privacy-enforcement system may instrument the authentication libraries used by the application client-side code in order to log not only the password as entered in the input field by the user but also its hash, which enables detecting whether the hash has been transmitted in the clear.

Architecture

Figure 3A:
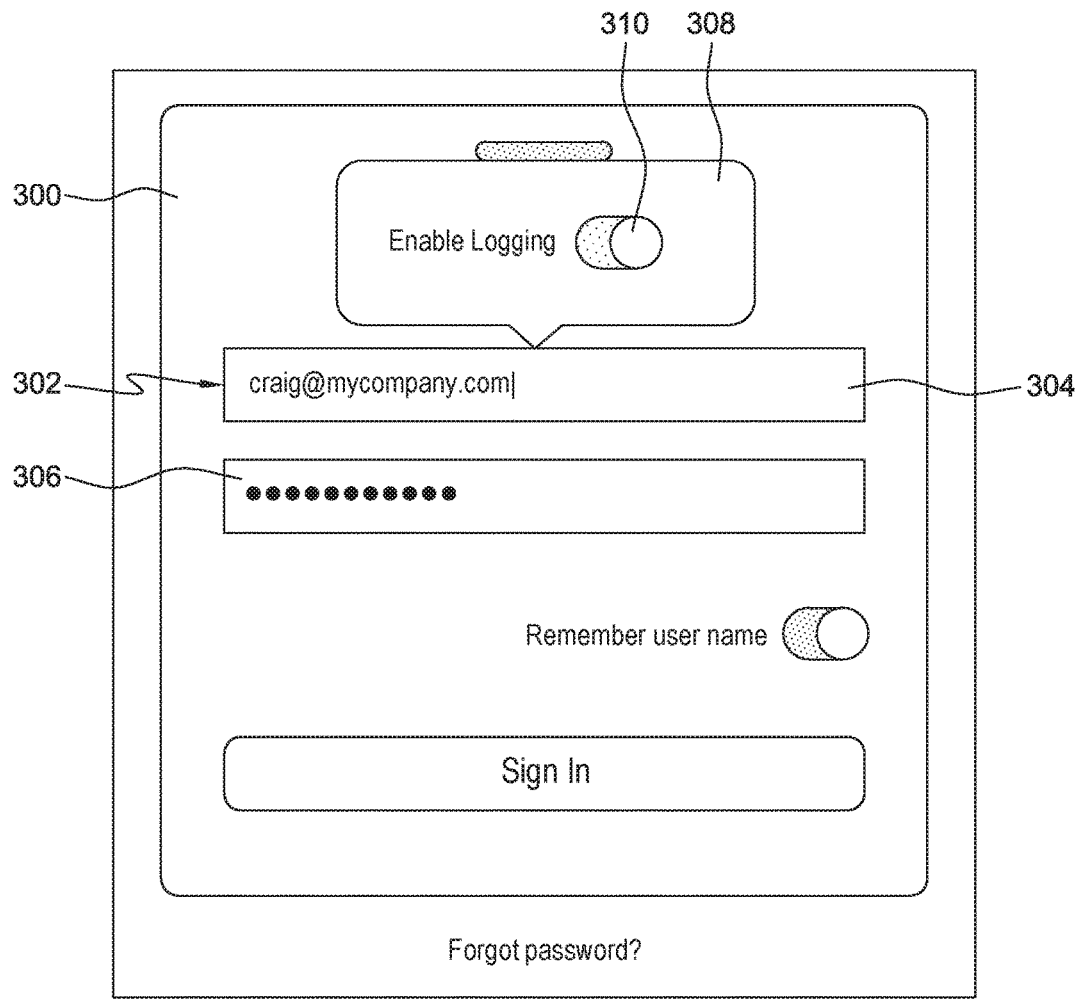
FIGS. 3A and 3B are illustrations of an example graphical user interface in accordance with an aspect of the present disclosure.
Figure 3B:
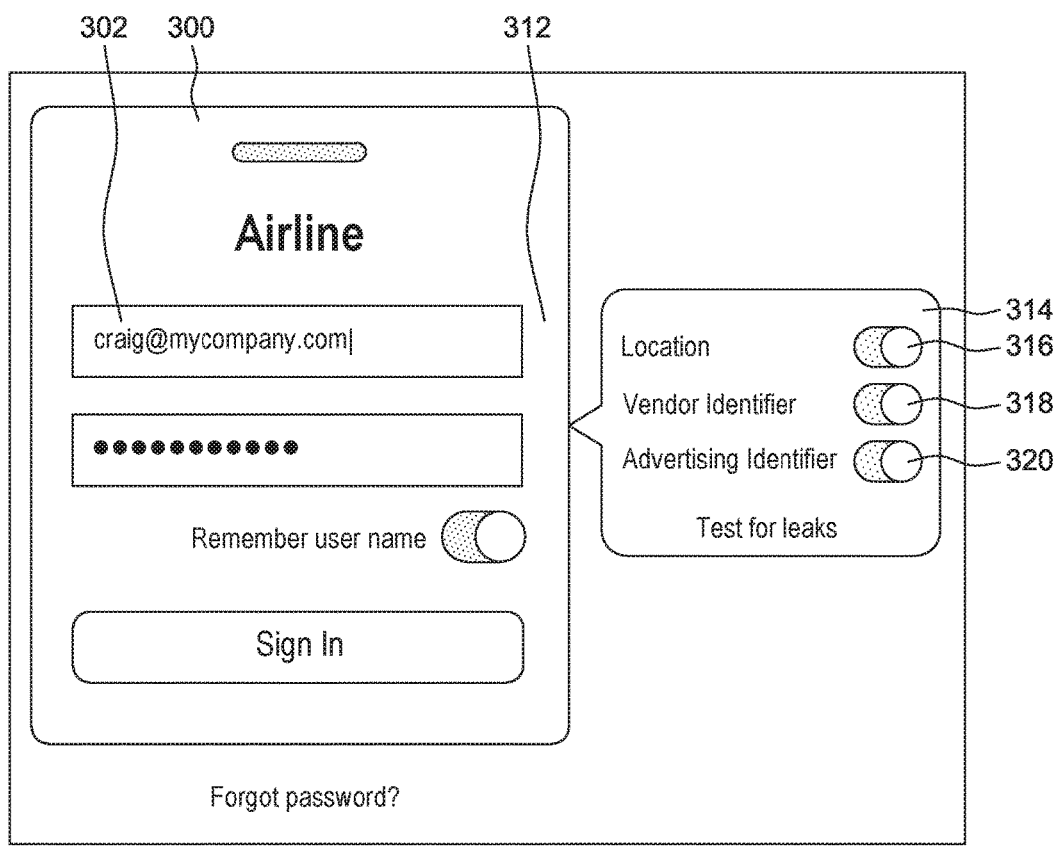
Figure 4:
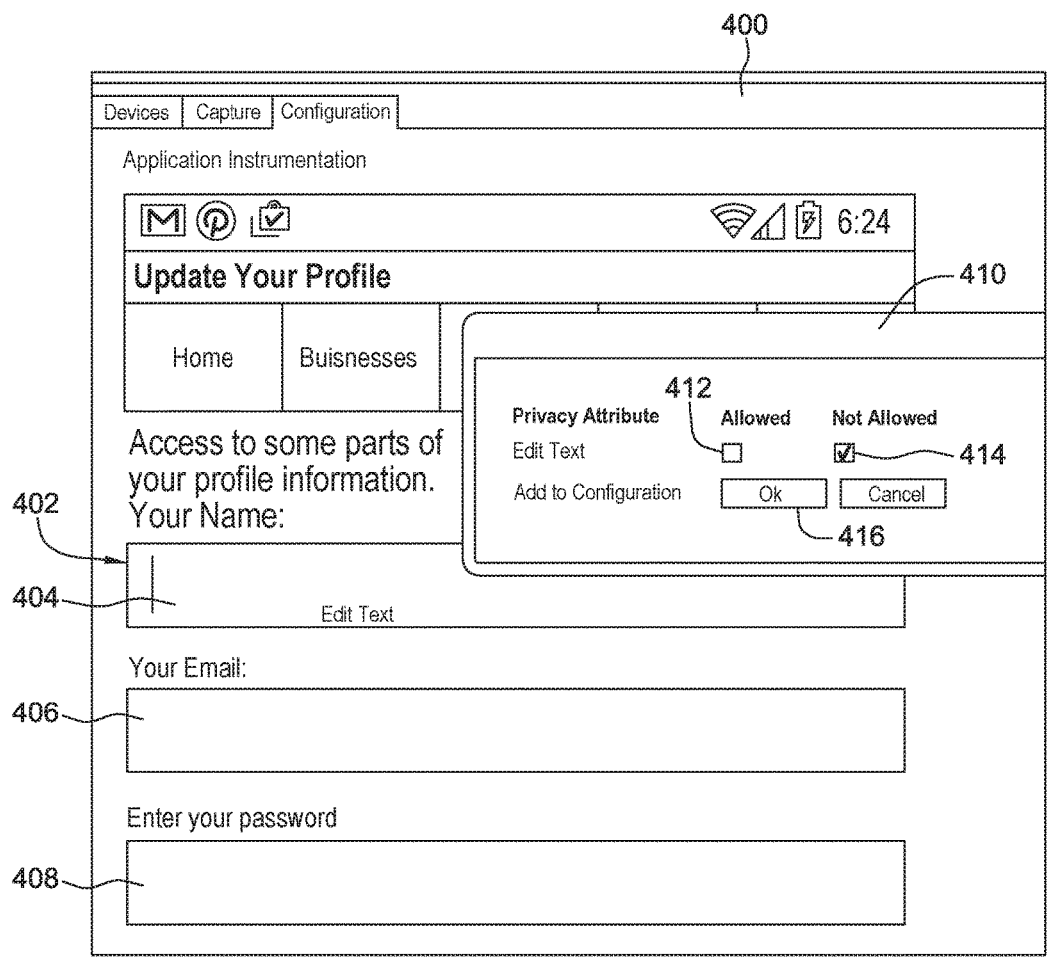
FIG. 4 is an illustration of an example graphical user interface in accordance with an aspect of the present disclosure.

With reference now to FIG. 1, an example privacy-enforcement system 100 includes a visual configuration framework 102 that allows end users to select the sources of confidentiality inside an application 104. Visual configuration framework 102 may include an interface that may be presented via a graphical user interface, e.g., GUI 300 or 400 (FIGS. 3A, 3B, and 4). The resulting configuration of sources selected by the user is embedded inside a client-side instrumentation and logging layer 106, which in turn becomes part of the application 104. During run time, the instrumentation layer 106 logs the values corresponding to the confidentiality sources specified by the user and stores them in a database 108. Simultaneously, a packet analyzer proxy 110 captures and logs any data transmitted by the application 104 over the network, for example, to application servers 112, and stores the logged data in proxy log files 114. A sophisticated value-similarity analyzer 116 may be implemented to detect matches between the confidential values logged by the instrumentation layer 106 stored in database 108 and the data captured by the proxy 110 stored in log files 114. If a similarity is detected, the proxy 110 may either obfuscate the data to ensure confidentiality, or prevent the data from being transmitted to the application servers 112.

Privacy-enforcement system 100 is designed to ensure high usability. This translates into three principal goals: low overhead, portability across platforms, and a simple configuration interface.

Low Overhead

To constrain runtime overhead, privacy-enforcement system 100 does not perform statement-level information flow tracking between privacy sources and release points to detect potential privacy threats. While some systems may be able to achieve statement-level information flow tracking with low overhead, they often require nontrivial platform modifications without the ability to customize the privacy policy. This requirement for nontrivial platform modifications and lack of modifiability conflicts with the goals of portability and easy configurability. Instead, privacy-enforcement system 100 performs value-based detection of privacy threats. For example, privacy-enforcement system 100 may record accesses to private fields by instrumenting the application code, and at the same time record data about to be released via an application output, for example, a dedicated proxy. The values about to flow out of the application through the application output may then be compared to the values received by the private fields. In some aspects, for robustness, privacy-enforcement system 100 may search for significant similarity as opposed to perfect matches. For example, privacy-enforcement system may search for a similarity above a pre-determined threshold, e.g., 75% similarity, 90% similarity, etc. The predetermined threshold may pre-set by privacy-enforcement system 100 or may be configurable by a user of system 100.

In some aspects, the similarity may be determined based on a string-similarity analysis using various string metrics. An example string metric which is efficiently computable includes hamming distance. The hamming distance assumes that the strings are of equal length. The hamming distance between two strings is equal to the number of positions at which the corresponding symbols are different, as indicated by the indicator function $\delta_{c1=c2}$:

$$\mathrm{ham}(a, b) = \Sigma_{0 \leq i \leq |a|} \delta_{c1=c2}(a(i), b(i)) \qquad (1)$$

Hamming distance measures the number of substitutions required to change one string into the other.

Another example string metric is the Levenshtein Distance. The Levenshtein string metric computes the distance between strings a, b (of length |a| and |b| respectively) as $\mathrm{lev}_{a,b}(|a|, |b|)$ where:

$$\mathrm{lev}_{a,b}(i, j) = \begin{cases} \max(i, j) & \text{if } \min(i, j) = 0, \\ \min \begin{cases} \mathrm{lev}_{a,b}(i-1, j) + 1 \\ \mathrm{lev}_{a,b}(i, j-1) + 1 \\ \mathrm{lev}_{a,b}(i-1, j-1) + 1_{(a_i \neq b_j)} \end{cases} & \text{Otherwise} \end{cases}$$

Lev(|a|,|b|) is the minimum number of single-character edits, e.g., insertion, deletion, or substitution, needed to transform string a into string b.

Portability

Privacy-enforcement system 100 does not require instrumenting the entire operating system of a user device.

Instead, privacy-enforcement system 100 acts at the level of individual applications. Privacy-enforcement system 100 embeds instrumented classes into the subject application that may be loaded at run time. This may be accomplished in a platform-dependent manner. For example, privacy-enforcement system 100 may utilize instrumented classes that extend standard Application Programming Interfaces (APIs) with enterprise features. For example, privacy-enforcement system 100 may replace standard user interface classes such as, for example, views, buttons, and form fields, with instrumented versions provided as part of the privacy-enforcement system 100 framework. The most basic extensions in the instrumented versions execute standard class behavior, but also include code that allows privacy-enforcement system 100 to log all the private data entered by end users including, for example, user ID, password, and credit-card number, as well as data that the application retrieves from the environment of the user device, such as, for example, the device's location. The data logged by the privacy-enforcement system 100 framework may be stored in a database for subsequent comparison with the data logged at run time by the Packet Analyzer 110.

Visual Configuration

In order to establish what information has to be considered private, privacy-enforcement system 100 is equipped with an integrated Visual Configuration Framework 102 that gets compiled into application 104 itself. On an Android® operating system, the visual configuration framework 102 may be embedded directly into the application at the level of the Dalvik bytecode, without requiring access to the application 104's source code. On iOS™, the source code may be necessary in order to compile the visual configuration framework 102 into the application 104, but no source-code editing is required. Therefore, the visual configuration framework 102 allows even non-developers to instrument an application with a security configuration that reflects application-specific confidentiality properties.

The visual configuration framework 102 enables pop-up displays of context menus for enabling or disabling the logging of custom user data. Visual configuration framework 102 supports the use of standard gestures native to the operating system on which application 104 is implemented to display context menus allowing for the selection of source inputs. With privacy-enforcement system 100, any administrator, even one lacking knowledge of the internal structure or the code of application 104, may easily create an instrumentation configuration which specifies the features to be tracked at run time. Such features can be application-specific or environment-dependent. The resulting configuration may then be used to create a customized instrumented version of the application 104 that is subsequently deployed in place of the original application 104.

Figure 2:
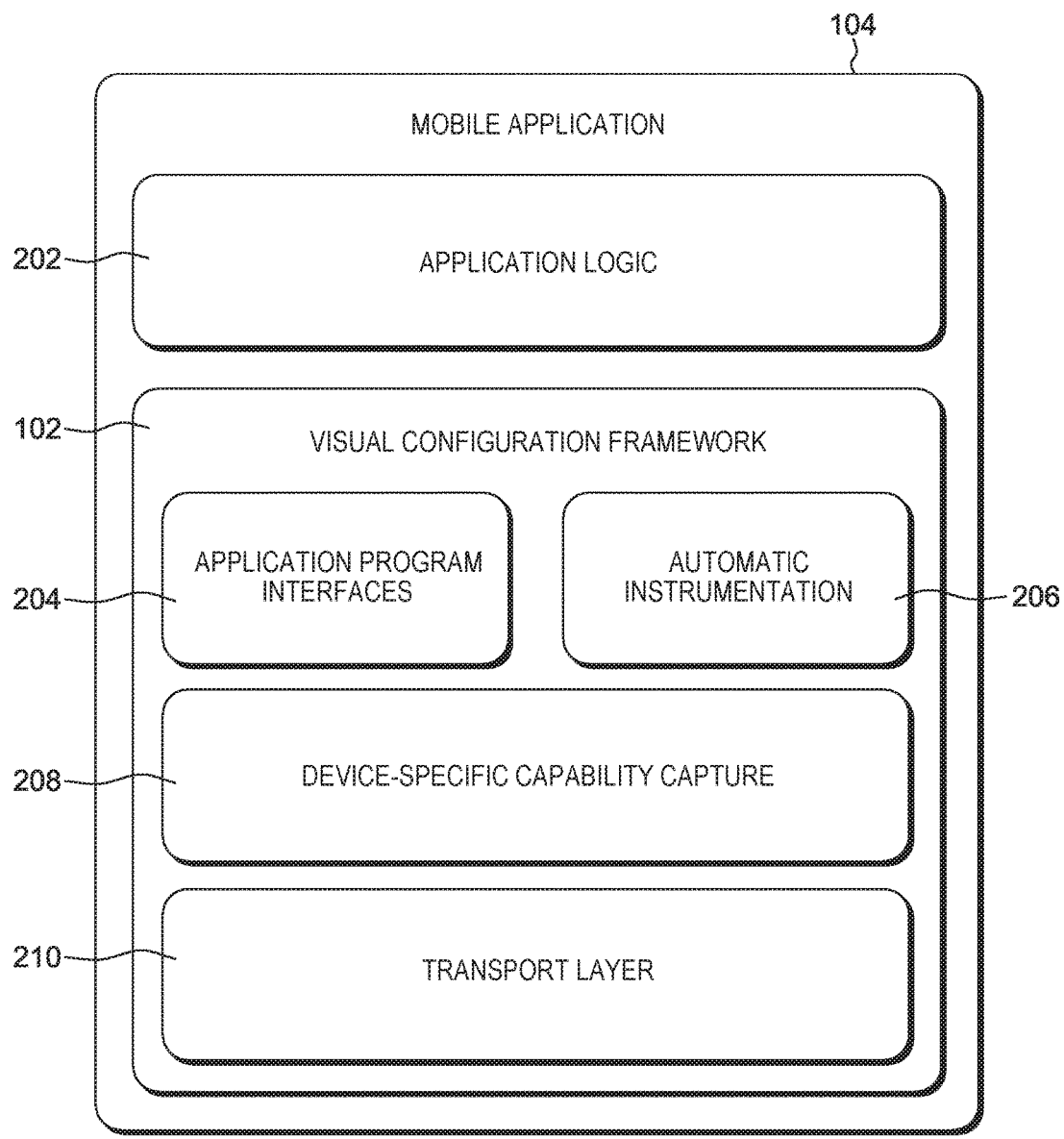
FIG. 2 is a component diagram of a mobile application in accordance with an aspect of the present disclosure.

With reference now to FIG. 2, the application 104 may include application logic 202 and visual configuration framework 102. Visual configuration framework 102 may include application program interfaces (API) code 204, automatic instrumentation code 206, code for device-specific capability capture 208 and a transport layer 210 for network input/output related to packets. Device-specific capability capture 208 may include various features associated with a particular user device, for example, GPS sensors, microphones, touch screen, or any other input source that may be used or tracked by visual configuration framework 102. Transport layer 210 may support communications between application 104 and visual configuration framework 102 and value-similarity analyzer 116. For example, transport layer 210 may be a software or hardware system on the user device that supports the communication between visual configuration framework 102, application 104, database 108, packet analyzer proxy 110, application servers 112, proxy logs 114, value-similarity analyzer 116. For example, transport layer 210 may support the communication of input source information from application 104 to visual configuration framework 102, database 108, and value-similarity analyzer 116, and the communication of collected output information from packet analyzer proxy 110 to proxy logs 114 and value-similarity analyzer 116.

Application Program Interfaces

With reference now to FIGS. 3A and 3B and 4, the application 104 may present graphical user interfaces (GUIs) 300 and 400 to a user, for example, via a display of a user's computing device. As a non-limiting example, GUI 300 may be implemented on a device running an iOS™ operating system while GUI 400 may be implemented on a device running an Android® operating system. GUI 300 and GUI 400 are not limited to implementation on a specific device or operating system, and may be implemented on any device running any operating system.

GUI 300 includes one or more fields 302 that are configured to receive user information. The user may input the information into fields 302 using a standard input device such as, for example, a keyboard, mouse, touch screen, microphone, or other similar input devices that allow the user to input information. For example, GUI 300 may include a field 304 that is configured to receive a user name and a field 306 that is configured to receive a password. In some aspects, GUI 300 may include other fields 302 for receiving various kinds of information. For example, GUI 300 may include a field 302 that is configured to receive a name, date of birth, location, credit card number, credit card CCV, social security number, or any other information that the user may be required or requested to input into application 104.

The user may select or activate a field 302 to input information into the field 302. For example, the user may click on the field using a mouse or touch screen, may tab through the fields using a keyboard, or other similar methods of selection or activation. In some aspects, in response to a user selection or activation of a field 302, visual configuration framework 102 may present a graphics overlay 308 to the user via graphical user interface 300. Overlay 308 is configured to present configuration options associated with the selected or activated field 302 to the user. For example, overlay 308 may include an element 310 that is activatable by the user to enable logging of the information input into the selected or activated field 302. For example, an activation of element 310 by the user indicates to visual configuration framework 102 that the information entered into the selected or activated field 302 is considered sensitive information that needs to be tracked by visual configuration framework 102.

In some aspects, an additional action must be taken by the user to trigger the presentation of overlay 308. For example, after the user selects or activates field 302, user may be required to perform an additional action such as, for example, activating field 302 a second time, activating field 302 with a second input on the input device (where the initial activation is triggered by a first input of the input device), activating field 302 with the first and second inputs at the same time, maintain activation of field 302 for a predetermined period of time (e.g., holding down a mouse button over the field for the predetermined period of time), or other similar additional actions. The requirement for an additional action may allow the user to limit the presentation of overlay 308 to only those fields for which the user requires logging of the input information by visual configuration framework 102.

With reference now to FIG. 3B, in some aspects, a user may also wish to log or track sensitive information that is not directly input by the user into GUI 300. For example, a user may wish to track environment variables such as the user's location, device usage history (e.g., what web pages were accessed, what applications were used, etc., how long the user used a particular aspect of the device, etc.), non-user identifiers such as, for example, vendor identifiers, device identifiers, advertising identifiers, etc., or other similar environmental data that may be generated or native to the device but is not input by the user directly via GUI 300 of application 104.

In some aspects, the user may select or activate a portion 312 of GUI 300 that is not a field 302 and in response to a user selection or activation of the portion 312 of GUI 300, visual configuration framework 102 may present an overlay 314 to the user via graphical user interface 300. Overlay 314 is configured to present configuration options associated with environmental variables that are not input via fields 302. As a non-limiting example, overlay 314 may include elements 316, 318, and 320 that are activatable by the user to enable logging of information associated with location, vendor identifiers, and advertising identifiers, respectively. For example, an activation of element 316 by the user indicates to visual configuration framework 102 that location information is considered sensitive information that needs to be tracked by visual configuration framework 102, an activation of element 318 by the user indicates to visual configuration framework 102 that vendor identifier information is considered sensitive information that needs to be tracked by visual configuration framework 102, and an activation of element 320 by the user indicates to visual configuration framework 102 that advertising identifier information is considered sensitive information that needs to be tracked by visual configuration framework 102. Additional or alternative elements for enabling logging of information associated with additional or alternative environmental variables may also be presented by overlay 314.

Referring now to FIG. 4, GUI 400 includes one or more fields 402 that are configured to receive user information in a similar manner to that described above with reference to GUI 300. For example, GUI 400 may include a field 404 that is configured to receive a name of a user, a field 406 that is configured to receive an e-mail address of the user, and a field 408 that is configured to receive a password of the user. In some aspects, GUI 400 may include other fields 402 for receiving various kinds of information similar to those described above with reference to GUI 300.

The user may select or activate a field 402 to input information into the field 402 as described above with respect to GUI 300. In some aspects, in response to a user selection or activation of a field 402, visual configuration framework 102 may present an overlay 410 to the user via graphical user interface 400. In some aspects, the presentation of overlay 410 may require an additional action similar to those described above with respect to overlay 308. Overlay 410 is configured to present configuration options associated with the selected or activated field 402 to the user. For example, overlay 410 may include an element 412 that is activatable by the user to enable logging of the information input into the selected or activated field 402. For example, element 412 may be a check box that may be activated to allow logging. In some aspects, overlay 410 may also or alternatively include an element 414 that is activatable by the user to prevent logging of the information input into the selected or activated field 402. For example, element 414 may be a check box that may be activated to prevent logging. Once the user has activated one of elements 412 and 414, or neither of check boxes 412 and 414, the user may activate an element 416 to confirm the setting.

In some aspects, the user may select or activate a portion of GUI 400 that is not a field 402 and in response to a user selection or activation the portion of GUI 400, visual configuration framework 102 may present an overlay to the user via graphical user interface 400 in a similar manner to that describe above for overlay 314 of GUI 300.

Application Instrumentation

In some aspects, the instrumentation layer 106 may be implemented by injecting instrumentation into the executable or compiled code of the application 104 without the need for editing the source code. Any application 104 may be instrumented, with or without access to the source code itself. For example, the application bundle, e.g., the application as shipped, transmitted to the end user, or installed on the user device, may be instrumented without the actual source code being available. This may be especially important on proprietary operating systems where, for example, access to the source code may not be available.

Depending on the operating system on which application 104 is run, different methods of instrumentation may be used. For example, on an Android® based operating system, a custom class loader may be injected into the application bundle after compilation directly inside the android application package (APK) by rewriting the Dalvik bytecode itself. This is possible even when the application's source code is not available. At run time, the custom class loader may load specialized versions of classes of the operating system's application program interface (API) that are used by the application 104. The specialized versions of the classes may be loaded instead of the original versions of the classes included in the API. For example, every time the application 104 makes a call to a class of the operating system's API, the specialized version of that class may be loaded instead of the original version. The specialized version may include additional code for tracking and logging user inputs and application outputs according to the settings set by the user via GUIs 300 and 400. For example, the specialized version may track and log any inputs or other confidential data that are entered into fields 302 or 402 if logging for those fields has been enabled via overlays 308 and 410. The logged data may be stored, for example, in database 108. In addition, the specialized version may track and log application outputs associated with the input data and any environmental variables for which logging has been enabled via overlay 314. The specialized version of the operating system API may also call the original version of the operating system's API or may perform the same operation that the original version would have performed such that the semantics of the application 104 are not broken.

As another example, on the iOS operating system, where class loading injection is not an option, a special feature of the Objective-C® and Swift® programming languages called method swizzling may be used. Method swizzling allows instrumentation access by redirecting a method call to an alternative method, e.g., for logging purposes, and then redirecting the call back to the original method that would have been called otherwise. For example, the method invocations in Objective-C and Swift may be modified at run time by changing how selectors are mapped to underlying functions in the class' dispatch table. The method may log the input and output of confidential data according to settings provided by the user via GUIs 300 and 400 as described above. Although the source code is not edited, in some aspects, the source code may be necessary in order to compile the additional instrumentation logic into the application bundle. The logged data may be stored in log files 114 for later use.

Both of the above methods of instrumentation do not require source-code editing and may be carried through even by a party other than the developer of the application 104. Therefore, even applications 104 that are no longer under development may be instrumented. For example, legacy applications 104, applications 104 made by developers that are no longer in business, and other similar applications 104 where the source code is no longer available may be instrumented.

Security Analysis

Once the application has been instrumented, any inputs provided by the user to the fields 302 or 402 that the user has enabled tracking on will be tracked by visual configuration framework 102. In addition, any environment variable for which tracking has been enabled will also be tracked by visual configuration framework 102. For example, if a user inputs a value into field 304, e.g., craig@mycompany.com, visual configuration framework 102 may log this value and store it in database 108 for later comparison to proxy logs 114.

In some aspects, for robustness, visual configuration framework 102 may parse the value for any component pieces or potential reformatting that may be performed by application 104 when application 104 utilized the value. For example, visual configuration framework 102 may utilize a string parsing tool or programming language, e.g. perl, to parse the value. For example, when application 104 receives the value craig@mycompany.com from field 304, application 104 may extract and send a portion of the value, e.g., craig or craig@mycompany, as an output to a server or other application output location.

To account for potential reformatting performed by application 104, visual configuration framework 102 may remove or separate out the different components of the value. For example, in some aspects, visual configuration framework 102 may remove components such as, for example, as dashes, ampersands, periods, or other similar connectors. For example, in addition to the input value of craig@mycompany.com, the value may also be stored as craigmycompanycom. In some aspects, for example, visual configuration framework 102 may separate out text components such as, e.g., craig, mycompany, com, or other similar text components for separate storage and use by visual configuration framework 102. In some aspects, for example, the entire value or a portion of the value may be hashed and stored in hashed form. In some aspects, for example, the entire value or a portion of the value may be encoded, e.g., using Base64 encoding, and stored in encoded form. Other similar parsing functions may also be performed to ensure the robust capture and logging of the sensitive information.

Packet analyzer proxy 110 analyzes and stores in proxy logs 114 any output data from application 104. The output data is compared by to the stored value obtained by the instrumentation 106 by value-similarity analyzer 116. For example, if application 104 outputs the user name in its entirety in the clear, e.g., craig@mycompany.com, packet analyzer proxy 110 captures this output and sends the output to the proxy logs 114 for comparison to the values (original and parsed or modified) captured by instrumentation 106 and stored in database 108.

Similarity Determination

Once an input value has been captured by instrumentation 106 and stored in database 108 and output data has been captured by packet analyzer proxy 110 and stored in proxy logs 114 a comparison may be made to determine if the output data corresponds to the stored input value. For example, the output data and input value (or any reformatted version or portion of the input value) may be compared to determine whether there is a match. In some aspects, the match may be a direct match, e.g., if the input value is "craig@mycompany.com" and the output data includes "craig@mycompany.com," a direct match may be detected by system 100. Likewise, if the output data includes only the term "craig", the stored portions of the input value of "craig" may be directly matched to the output data.

In some aspects, a similarity between the captured input value and captured output data may be determined. For example, a bayesian algorithm may be used to determine a similarity between the input value and output data. In some aspects, the determined similarity may be a percentage, for example, 50% similarity, 60% similarity, etc. In some aspects, system 100 may determine a match when the determined similarity is above a pre-determined threshold, e.g., when the similarity is above 75%, 80%, or any other percentage of similarity. The pre-determined threshold may be set in advance, set by system 100, set by a user of system 100, or in any other manner. For example, the pre-determined threshold may be set by a security analyst.

If the captured input value and the captured output data achieve the pre-determined threshold of similarity, system 100 may perform one or more corrective actions. For example, in some aspects, system 100 may prevent the output data from exiting the application 104. This may serve the purpose of preventing sensitive data from being exposed in an unsecure manner. Where this approach is untenable, e.g., because it will crash the application 104, system 100 may also or alternatively modify or convert the output data to secure output data, for example, by encrypting the output data before allowing the output data to be sent to its final destination. Although this may work in some aspects, it is also possible that the final destination, e.g., a server associated with the application, may be expecting the output data in a certain format where receipt of encrypted data may cause the application to fail in sending or crash. In some aspects, system 100 may also or alternatively inform the developer of the application of the potential security flaw so that corrective action may be taken.

Configurable Instrumentation

When a normal instrumentation method is used on an application, the instrumentation typically becomes part of the application bundle. If the instrumentation or the application changes for any reason, a new application has to be shipped and/or updated and new instrumentations has to be added to the application. This process may be cumbersome where, for example, applications are updated often. For example, many mobile applications are updated by the developer monthly, and in some cases even weekly or daily. Requiring new instrumentation every time the application updates may be both cumbersome and untenable. To overcome this issue, in some aspects, the instrumentation 106 may be configurable via a configuration file. Since the instrumentation does not directly depend on the application code itself (as mentioned in the above example, system library method calls are used instead), the instrumentation may be easily configured in a configuration file for use with the application. The configuration file may be, for example, an xml file. The configuration file may receive instrumentation settings that may change the behavior of the instrumentation, change the security policy, etc. For example, an update to the instrumentation based on the user activating or enabling logging of a particular input field or environmental variable may be performed by updating the configuration file. As an example, instrumentation may be present for a large number of operating system method calls but may only be activated when a corresponding part of the configuration file for that instrumentation is set to active. This may allow the instrumentation to be vetted and approved by the operating system manufacturer, while still providing customizability to the end user of the application. This may be especially important for iOS™ where, for example, no new code may be dynamically loaded without approval. By implementing instrumentation with a corresponding configuration file, the instrumentation may dynamically adjust to changes in which fields or variables are logged without violating this operating system based limitation.

Figure 5:
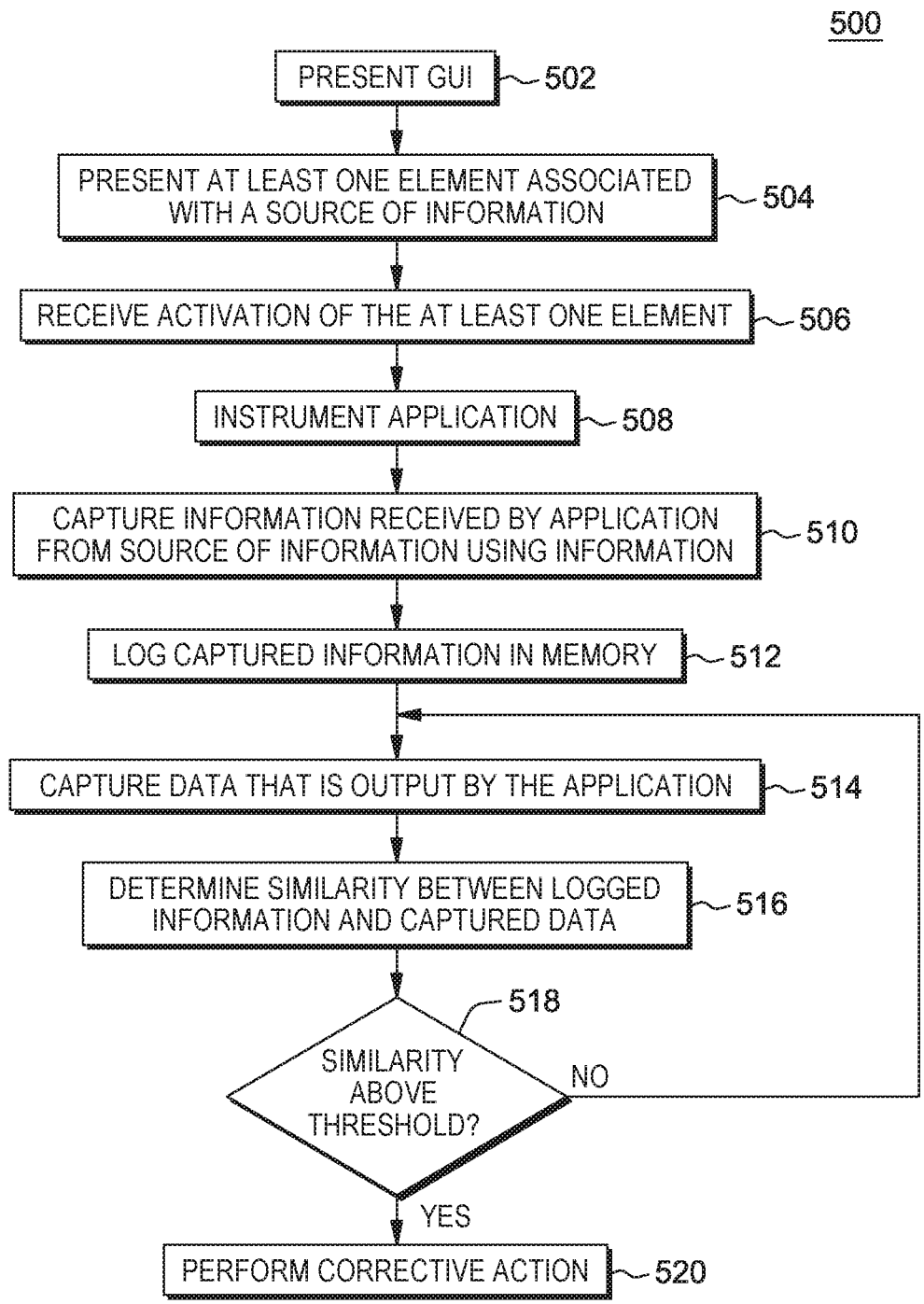
FIG. 5 is a flow chart illustrating an example method of dynamically automating application testing in accordance with an aspect of the present disclosure.

With reference now to FIG. 5, a method 500 providing visually configurable privacy enforcement for an application is illustrated. At 502, a graphical user interface, e.g., GUI 300 or GUI 400, is presented to a user via a user device. The graphical user interface may be part of application 104. At 504, at least one element associated with a source of information is presented to the user via the graphical user interface. The source of information may include, for example, fields 302, 402, environment variables, or any other sources of information. The at least one element may include, for example, element 310, element 316, element 318, element 320, or any other element that is activatable by the user to specify the source of information as a source of information to be logged. At 506, an activation of the at least one element is received from the user via the GUI. The activation may, for example, specify that the source of information is to be logged or that the source of information is not to be logged. At 508, in response to receiving the activation of the at least one element, the application 104 is instrumented with instrumentation 206 that is configured to capture and log information received from the specified source of information. At 510, at the time of running the application 104, the instrumentation 206 captures information received by the application 104 from the specified source, e.g., from one of fields 302, 402, or from an environmental variable such as, e.g., location. At 512, the captured information is logged in memory, e.g., database 108. At 514, packet analyzer proxy 110 captures data that is output by the application 104. At 516, system 100 compares the captured data to the logged information. For example, system 100 may determine a similarity between the logged information and the capture data. At 518, system 100 determines based on the comparison whether the similarity is above a pre-determined threshold where a similarity above the pre-determined threshold may indicate that a leak of the information has occurred. If the similarity is not above the pre-determined threshold, packet analyzer proxy 110 may continue to monitor and capture data that is output by the application at 514. If the similarity is above the predetermined threshold, system 100 performs a corrective action at 520, e.g., preventing the output data from leaving the application, reformatting the output data, encrypting the output data, informing a developer of the application of the leak, or other similar corrective actions.

Figure 6:
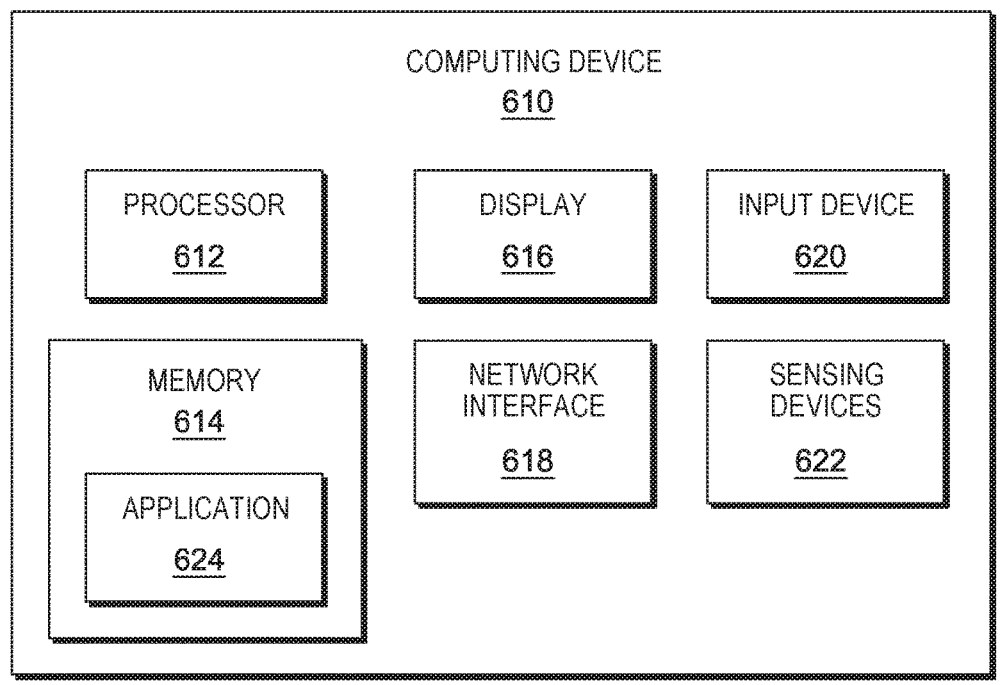
FIG. 6 is a system diagram of a computing device in accordance with an aspect of the present disclosure.

With reference now to FIG. 6, an example computing device 610 is illustrated. Computing device 610 may include, for example, at least one processor 612, memory 614, a display 616, a network interface 618, input device 620, one or more sensing devices 622, and any other feature commonly found in a computing device. Computing device 610 may include, for example, personal computers, tablets, laptops, mobile devices, smart phones, smart watches, smart wearable devices, or other similar computing devices.

Memory 614 may include instructions, software, and/or programs that may be executed by processor 612. In some aspects, memory 614 may include application 624 that may be implemented by computing device 610. For example, third-party applications may be downloaded, installed, or otherwise executed by computing device 610. Application 104 may be one such third-party application.

Display 616 is configured to visually convey information to a user of computing device 610. Display 616 may include, for example, computer displays, television displays, smart device displays, smart phone displays, smart watch displays, projectors, a virtual reality headset display, or any other display or screen capable of visually presenting information to a user. In some aspects, display 616 may also function as an input device 620. For example, display 616 may be a touch screen. Display 616 may be configured to present GUIs 300 and 400 to a user.

Network interface 618 may be configured to communicate with one or more servers, another computing device, the internet, the cloud, or any other device, via wired or wireless technology.

Input device 620 may include a mouse, keyboard, gamepad, touch screen, button, or any other input device that provides a user with the capability to interact with computing device 610.

Sensing devices 622 may include any sensing device such as, for example, a microphone, digital camera, video camera, GPS tracker, gyroscopes, motion sensors, and other similar sensing devices. Sensing device 622 may be configured to generate sensor data. The sensor data may be provided to computing device 610 and may be stored in memory 614. In some aspects, the sensor data may be transmitted via network interface 618 to one or more servers, another computing device, the internet, the cloud, or any other device. For example, the sensor data may be output data that is captured by analyzer proxy. In some aspects, the sensor data may include confidential data about computing device 610, e.g., the sensor data may be the source of information. In some aspects, sensor data may include environment variables of computing device 610 (e.g., location information generated by the GPS tracker).

Figure 7:
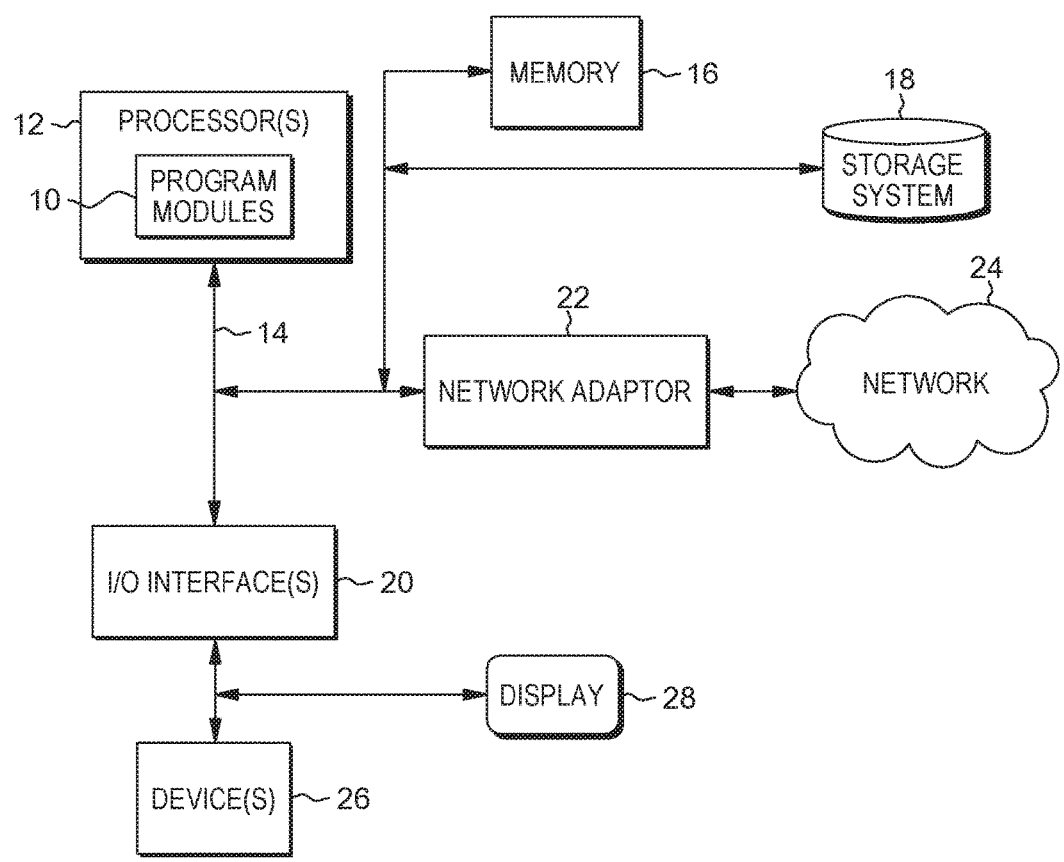
FIG. 7 illustrates a schematic of an example computer or processing system that may implement any component of the system for visually configurable privacy enforcement in accordance with an aspect of the present disclosure.

FIG. 7 illustrates a schematic of an example computer or processing system that may implement any or all of the components of system 100 and computing device 610. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the system shown in FIG. 1 and the computing device shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method performed by at least one hardware processor, comprising:

presenting via a graphical user interface of an application installed on a user device at least one element associated with a source of information, the at least one element activatable by the user to specify the source of information as a source of information to be logged;

receiving from the user via the graphical user interface, an activation of the at least one element, the activation specifying that the source of information is to be logged;

in response to receiving the activation of the at least one element, instrumenting the application using a configuration file, the instrumentation configured to capture and log information received from the specified source of information, wherein the instrumentation is performed based on a setting for the instrumentation in the configuration file being set to active in response to receiving the activation of the at least one element, the instrumentation is configurable based on changes to the configuration file, and instrumenting the application comprises, based on an operating system of the user device, performing one of:

modifying compiled bytecode of the application to inject a custom class loader into the application, wherein the custom class loader loads specialized versions of classes of an application program interface (API) of the operating system instead of an original version of the classes in response to calls made by the application to the classes of the API, and the specialized version includes additional code for tracking and logging the source of information specified by the activation; and modifying, in a dispatch table, mappings between selectors and underlying functions in classes of the API to redirect method calls from the application to method calls that are specified for tracking and logging the source of information specified by the activation;

capturing information received by the application from the specified source using the instrumentation;

logging the captured information in memory;

capturing data that is output by the application;

comparing the captured data to the logged information, wherein the comparing comprises:

determining a similarity between the captured data and the logged information based on a string-similarity analysis;

determining that the similarity is above a pre-determined threshold value;

in response to the similarity being greater than the pre-determined threshold value, determining based on the comparison that a leak of the information has occurred;

in response to determining that a leak of the information has occurred, performing at least one corrective action, wherein the at least one corrective action comprises preventing the captured data from exiting the application, reformatting the captured data, encrypting the captured data, and sending a notification to a developer of the application of the leak of the information.

2. The method of claim 1, wherein the source of information is an input field of the graphical user interface of the application.

3. The method of claim 2, further comprising receiving an activation of the input field, the presentation of the at least one element occurring in response to the received activation of the input field.

4. The method of claim 1, wherein the source of information is an environment variable of the application.

5. The method of claim 4, further comprising receiving an activation of a portion of the graphical user interface other than an input field, the presenting of the at least one element occurring in response to the received activation of the portion of the graphical user interface other than an input field.

6. The method of claim 1, wherein instrumenting the application comprises injecting instrumentation into executable code of the application.

7. The method of claim 6, wherein instrumenting the application comprises the use of at least one of a custom class loader and method swizzling.

8. The method of claim 1, wherein the string-similarity analysis comprises one of:

a determination of a Hamming distance between the captured data and the logged information; and a determination of a Levenshtein distance between the captured data and the logged information.

9. The method of claim 1, wherein determining the similarity between the captured data and the logged information further comprises applying a Bayesian algorithm.

10. The method of claim 1, further comprising:

detecting a selection of an input field in the graphical user interface made by the user; and prompting the user to perform an additional action in the graphical user interface;

wherein presenting the at least one element associated with the source of information via the graphical user interface is performed in response to the user having performed the additional action in the graphical user interface.

11. The method of claim 1, further comprising:

detecting a selection of a portion in the graphical user interface made by the user, wherein the portion does not include an input field; and prompting the user to perform an additional action in the graphical user interface;

wherein presenting the at least one element associated with the source of information via the graphical user interface is performed in response to the user having performed the additional action in the graphical user interface.

12. The method of claim 1, wherein the configuration file is an Extensible Markup Language (XML) file.

13. A system comprising:

at least one hardware processor configured to:

present via a graphical user interface of an application installed on a user device at least one element associated with a source of information, the at least one element activatable by the user to specify the source of information as a source of information to be logged;

receive from the user via the graphical user interface, an activation of the at least one element, the activation specifying that the source of information is to be logged;

in response to receiving the activation of the at least one element, instrument the application using a configuration file and based on an operating system of the user device, the instrumentation configured to capture and log information received from the specified source of information, wherein the instrumentation is performed based on a setting for the instrumentation in the configuration file being set to active in response to receiving the activation of the at least one element, the instrumentation is configurable based on changes to the configuration file, and wherein to instrument the application based on the operating system of the user device, the at least one hardware processor is further configured to perform one of:
    modify compiled bytecode of the application to inject a custom class loader into the application, wherein the custom class loader loads specialized versions of classes of an application program interface (API) of the operating system instead of an original version of the classes in response to calls made by the application to the classes of the API, and the specialized version includes additional code for tracking and logging the source of information specified by the activation; and
    modify, in a dispatch table, mappings between selectors and underlying functions in classes of the API to redirect method calls from the application to method calls that are specified for tracking and logging the source of information specified by the activation;
capture information received by the application from the specified source using the instrumentation;
log the captured information in memory;
capture data that is output by the application;
compare the captured data to the logged information, wherein to compare the captured data, the at least one hardware processor is further configured to:
    determine a similarity between the captured data and the logged information based on a string-similarity analysis;
    determine that the similarity is above a pre-determined threshold value;
    in response to the similarity being greater than the pre-determined threshold value, determine based on the comparison that a leak of the information has occurred; and
    in response to determining that a leak of the information has occurred, performing at least one corrective action, wherein the at least one corrective action comprises preventing the captured data from exiting the application, reformatting the captured data, encrypting the captured data, and sending a notification to a developer of the application of the leak of the information.

14. The system of claim 13, wherein the source of information is an input field of the graphical user interface of the application, the at least one hardware processor further configured to receive an activation of the input field, the presentation of the at least one element occurring in response to the received activation of the input field.

15. The system of claim 13, wherein the source of information is an environment variable of the application, the at least one hardware processor further configured to receive an activation of a portion of the graphical user interface other than an input field, the presenting of the at least one element occurring in response to the received activation of the portion of the graphical user interface other than an input field.

16. The system of claim 13, wherein instrumenting the application comprises injecting instrumentation into executable code of the application.

17. The system of claim 16, wherein instrumenting the application comprises the use of at least one of a custom class loader and method swizzling.

18. An apparatus comprising:
a display;
at least one input device;
at least one hardware processor associated with the at least one input device and the display, the at least one hardware processor configured to:
    present via the display, a graphical user interface of an application installed on the apparatus;
    present via the graphical user interface at least one element associated with a source of information, the at least one element activatable by the user via the input device to specify the source of information as a source of information to be logged;
    receive from the user via the at least one input device, an activation of the at least one element, the activation specifying that the source of information is to be logged;
    in response to receiving the activation of the at least one element, instrument the application using a configuration file and based on an operating system of the user device, the instrumentation configured to capture and log information received from the specified source of information, wherein the instrumentation is performed based on a setting for the instrumentation in the configuration file being set to active in response to receiving the activation of the at least one element, the instrumentation is configurable based on changes to the configuration file, and wherein to instrument the application based on the operating system of the user device, the at least one hardware processor is further configured to perform one of:
        modify compiled bytecode of the application to inject a custom class loader into the application, wherein the custom class loader loads specialized versions of classes of an application program interface (API) of the operating system instead of an original version of the classes in response to calls made by the application to the classes of the API, and the specialized version includes additional code for tracking and logging the source of information specified by the activation; and
    modify, in a dispatch table, mappings between selectors and underlying functions in classes of the API to redirect method calls from the application to method calls that are specified for tracking and logging the source of information specified by the activation;
    capture information received by the application from the specified source using the instrumentation;
    log the captured information in memory;
    capture data that is output by the application;
    compare the captured data to the logged information, wherein to compare the captured data, the at least one hardware processor is further configured to:
        determine a similarity between the captured data and the logged information based on a string-similarity analysis;
        determine that the similarity is above a pre-determined threshold value;
        in response to the similarity being greater than the pre-determined threshold value, determine based on the comparison that a leak of the information has occurred; and in response to determining that a leak of the information has occurred, performing at least one corrective action, wherein the at least one corrective action comprises preventing the captured data from exiting the application, reformatting the captured data, encrypting the captured data, and sending a notification to a developer of the application of the leak of the information.

19. The apparatus of claim 18, wherein the source of information is an input field presented by the graphical user interface of the application, wherein the at least one hardware processor is further configured to receive an activation of the input field from the input device, the presentation of the at least one element via the graphical user interface occurring in response to the received activation of the input field.

20. The apparatus of claim 18, wherein the source of information is an environment variable of the application, wherein the at least one hardware processor is further configured to receive an activation of a portion of the graphical user interface other than an input field via the user input, the presentation of the at least one element via the display occurring in response to the received activation of the portion of the graphical user interface other than an input field.

* * * * *